United States Patent
Artal Lahoz et al.

(10) Patent No.: US 9,006,621 B2
(45) Date of Patent: Apr. 14, 2015

(54) HOB WITH SEVERAL HEATING ELEMENTS WITH ENERGY EFFICIENCY CONTROL

(75) Inventors: Maria Carmen Artal Lahoz, Zaragoza (ES); Jose-Ramon Garcia Jimenez, Zaragoza (ES); Ignacio Garde Aranda, Zaragoza (ES); Pablo Jesus Hernandez Blasco, Cuarte de Huerva (ES); Ignacio Millan Serrano, Zaragoza (ES); Daniel Palacios Tomas, Zaragoza (ES); Ramon Peinado Adiego, Zaragoza (ES)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 806 days.

(21) Appl. No.: 13/143,938

(22) PCT Filed: Jan. 18, 2010

(86) PCT No.: PCT/EP2010/050520
§ 371 (c)(1),
(2), (4) Date: Jul. 11, 2011

(87) PCT Pub. No.: WO2010/084096
PCT Pub. Date: Jul. 29, 2010

(65) Prior Publication Data
US 2011/0272397 A1    Nov. 10, 2011

(30) Foreign Application Priority Data
Jan. 20, 2009    (ES) .................................. 200900239

(51) Int. Cl.
*H05B 6/10*    (2006.01)
*H05B 6/08*    (2006.01)
(Continued)

(52) U.S. Cl.
CPC .............. *H05B 6/1272* (2013.01); *H05B 6/065* (2013.01); *H05B 2213/03* (2013.01); *Y02B 40/126* (2013.01)

(58) Field of Classification Search
CPC .. H05B 6/065; H05B 6/1272; H05B 2213/03; H05B 40/126; Y02B 40/126
USPC .................................. 219/620, 622, 626, 477
See application file for complete search history.

(56) References Cited

U.S. PATENT DOCUMENTS 3,989,916 A * 11/1976 Amagami et al. ............ 219/622
4,388,520 A *  6/1983 McWilliams .............. 219/445.1
(Continued)

FOREIGN PATENT DOCUMENTS

EP    1303168 A1    4/2003
EP    1868417 B1    10/2010
(Continued)

OTHER PUBLICATIONS

International Search Report PCT/EP2010/050520.
(Continued)

*Primary Examiner* — Dana Ross
*Assistant Examiner* — John J Norton
(74) *Attorney, Agent, or Firm* — James E. Howard; Andre Pallapies

(57) ABSTRACT

A hob includes at least one heating zone having several heating elements, a user interface for setting a heating capacity of the heating zone, and a control unit for operating the heating elements and for distributing the heating capacity among the heating elements according to a heating capacity distribution. In order to improve the efficiency of the hob, the control unit is configured to distribute the heating capacity among a larger number of heating elements when the heating capacity is below a threshold value than in the case, when the heating capacity is above the threshold value.

20 Claims, 4 Drawing Sheets

(51) Int. Cl.
  *H05B 6/12*    (2006.01)
  *H05B 6/06*    (2006.01)

(56) References Cited

U.S. PATENT DOCUMENTS

| | | | |
|---|---|---|---|
| 5,352,864 A | 10/1994 | Schultheis et al. | |
| 6,018,149 A * | 1/2000 | Higgins | 219/462.1 |
| 6,242,721 B1 | 6/2001 | Borrmann et al. | |
| 6,498,325 B1 | 12/2002 | Akel et al. | |
| 6,614,006 B2 * | 9/2003 | Pastore et al. | 219/447.1 |
| 6,693,262 B2 * | 2/2004 | Gerola et al. | 219/462.1 |
| 6,870,138 B2 * | 3/2005 | Pastore | 219/447.1 |
| 6,930,287 B2 * | 8/2005 | Gerola et al. | 219/447.1 |
| 6,998,583 B2 * | 2/2006 | Yang et al. | 219/483 |
| 7,227,103 B2 * | 6/2007 | Esteras Duce et al. | 219/443.1 |
| 7,423,244 B2 * | 9/2008 | Baier et al. | 219/624 |
| 7,425,690 B2 * | 9/2008 | Schilling | 219/451.1 |
| 7,759,616 B2 | 7/2010 | Gouardo et al. | |
| 2001/0025848 A1 * | 10/2001 | Cornec et al. | 219/624 |
| 2005/0109770 A1 | 5/2005 | Esteras Duce et al. | |
| 2007/0164017 A1 * | 7/2007 | Gouardo et al. | 219/626 |
| 2007/0215605 A1 | 9/2007 | Baier et al. | |
| 2009/0008384 A1 * | 1/2009 | Roux | 219/622 |
| 2009/0120928 A1 * | 5/2009 | Lee et al. | 219/626 |
| 2010/0147832 A1 * | 6/2010 | Barker et al. | 219/626 |
| 2010/0230401 A1 * | 9/2010 | Miyauchi et al. | 219/665 |

FOREIGN PATENT DOCUMENTS

| | | |
|---|---|---|
| ES | 2284322 A1 | 11/2007 |
| WO | 9737515 | 10/1997 |
| WO | 2005069688 A2 | 7/2005 |
| WO | WO 2005069688 A2 * | 7/2005 |
| WO | 2008058614 A1 | 5/2008 |
| WO | 2008101766 A1 | 8/2008 |
| WO | 2008122495 A1 | 10/2008 |

OTHER PUBLICATIONS

National Search Report ES P200900239.

* cited by examiner

HOB WITH SEVERAL HEATING ELEMENTS WITH ENERGY EFFICIENCY CONTROL

BACKGROUND OF THE INVENTION

The invention relates to a hob having at least one heating zone having several elements and a method for operating such a hob.

FR 2 863 039 A1 discloses an induction hob having a plurality of inductors, which are arranged in a grid. A control unit detects cookware elements, which are placed on the induction hob and defines a heating zone having several heating elements for each cookware element. The shape, size and position of the heating zone are adjusted to the shape, size and position of the cookware element. The user can set a heating capacity of each of the heating zones by way of a user interface and the control unit operates the heating elements such that the desired heating capacity is distributed among the heating elements and/or inductors according to a predetermined heating capacity distribution.

To this end, the control unit determines a degree of cover for each inductor of the heating zones. The degree of cover corresponds to a proportion of the inductor, which is covered by a base of the detected cookware element. The heating capacity distribution then takes place essentially proportionately to the degrees of cover, so that inductors at the edge of the heating zone, which are only covered incompletely, are provided with a lower heating capacity than completely covered inductors. As a result, radiation losses at the edge of the heating zone are reduced.

The method known from FR 2 863 039 is very complicated in practice. On account of the reduced heating capacity of the inductors at the edge of the heating zone, the method also results in an inhomogeneous surface heating capacity. Operation of the inductors at the edge of the heating zone with a reduced heating capacity also results in proportionately higher switching and conduction losses in the inverters of the induction hob, which generate a high-frequency heating current for operating the inductors.

In large heating zones with numerous heating elements, an available heating capacity, which is generally limited by the available capacity in the domestic power network, is distributed among all heating elements in the case of large heating capacities. If the number of heating elements exceeds a critical value, all heating elements can therefore be operated with only a fraction of their maximum capacity. The switching losses and ohmic losses however increase with the number of heating elements, so that the efficiency is reduced overall.

BRIEF SUMMARY OF THE INVENTION

The object of the invention consists particularly in providing a generic hob with a higher degree of efficiency, whereby a homogeneous surface heating capacity should be achievable at the same time.

The object is achieved in accordance with the invention by the features of the independent claims, while advantageous embodiments and developments of the invention can be inferred from the subclaims.

The invention is based in particular on a hob having at least one heating zone having several heating elements, a user interface for setting a heating capacity of the heating zone and having a control unit for operating the heating elements and for distributing the heating capacity among the heating elements according to a heating capacity distribution.

It is proposed that the control unit be configured to determine the heating capacity distribution as a function of at least a size of the heating zone and/or the set heating capacity. As a result, the selected heating capacity distribution can be adjusted to actual requirements, which may be very different in different heating capacity ranges. In the case of large values of the heating capacity, the user generally wants a rapid heating of the cookware element and its contents. Power losses should therefore be reduced as far as possible in this case, so that a large proportion of the nominal capacity of the hob and/or the heating zone can be utilized. The efficiency of the hob when coupling the heating capacity into the cookware element is to be optimized. On the other hand efficiency is less important in the case of lower heating capacities, so the heating capacity distribution in this case can be selected to achieve the most homogeneous surface heating capacity possible.

The control unit can be configured for the inventive selection of the heating capacity distribution both by means of a suitable software and by means of a suitable hardware. To this end, the control unit can comprise a memory with different heating capacity distributions for instance. Alternatively or in addition hereto, a parametric function can be implemented in the control unit in order to determine the heating capacity distribution, which, in addition to the heating capacity, can also depend on further parameters, in particular on the size and geometry of the heating zone.

The advantages of the invention are particularly significant if the heating elements are inductors and/or if the hob is an induction hob. The heating capacity of the inductors is coupled into the cookware element with a great immediacy and the rapid response times allow for a flexible distribution of the heating capacity among the inductors.

In a development of the invention, it is proposed that the heating elements are arranged in a uniform grid and that the control unit is configured so as to detect a cookware element and to combine heating elements, which are covered at least partially by the cookware element, to form a heating zone. In matrix or micro module hobs of this type, the question of heating capacity distribution is of particular relevance to the efficiency of the hob, so that there is particularly great potential for improvement here.

Alternatively, the invention can also be used in hobs in which the heating elements of the heating zones are arranged concentrically, with at least one annular heating element surrounding at least one central heating element.

A concentration of the available and generally limited heating capacity of the hob or the heating zone onto the most important heating elements with the greatest efficiency can be achieved if the control unit is configured to distribute the heating capacity among a larger number of heating elements when heating capacities are below a threshold value than when heating capacities are above the threshold value. Above the threshold value, heating elements, which can only be operated with high losses or which contribute little to heating up the cookware element compared with other heating elements, can be switched off.

Since such heating elements are frequently arranged at the edge, it is also proposed that in the case of heating capacities below the threshold the control unit is configured to operate at least one heating element arranged at an edge of the heating zone, in addition to the heating elements used for heating capacities above the threshold value.

A further concentration of the available heating capacity can be achieved if, in the case of heating capacities below the threshold value, the control unit is configured to operate at least one heating element surrounded by other heating elements of the same heating zone on at least three sides, in addition to the heating elements used for heating capacities above the threshold value.

A further adjustment and optimization of the heating capacity distribution can be enabled if the control unit is configured to detect a cookware element placed on the heating zone and to determine the heating capacity distribution as a function of the size and/or the material of the cookware element.

According to a further aspect of the invention, it is proposed that the control unit be configured to select the heating capacity distribution from at least two different heating capacity distributions.

Since, in the case of very small heating zones, efficiency can only be improved minimally by adjusting the heating capacity distribution, it is proposed that the control unit be configured only to determine the heating capacity distribution as a function of the set heating capacity if the heating zone comprises at least five heating elements. The additional control and regulation costs can be reduced in such cases.

A time-dependent heating capacity distribution can be realized if the control unit is configured to use a different heating capacity distribution in a heating-up phase of a cooking process from the heating capacity distribution in at least a second phase which follows the heating-up phase. In the second phase the heating capacity distribution can then be optimized for instance in respect of the homogeneous surface heating capacity.

A further aspect of the invention relates to method for operating a hob with at least one heating zone having several heating elements as a function of a heating capacity set by way of a user interface of the hob, with the heating capacity being distributed among the heating elements according to a heating capacity distribution.

It is proposed that the heating capacity distribution be determined as a function of at least a size of the heating zone and/or of the set heating capacity. The efficiency of the hob can be improved by a control of this type, particularly in the case of high heating capacities in the region of a nominal capacity of the hob.

BRIEF DESCRIPTION OF THE DRAWINGS

Further advantages result from the following description of drawings. Exemplary embodiments of the invention are shown in the drawing. The drawing, the description and the claims contain a combination of numerous features. The person skilled in the art will expediently also consider the features separately and combine them to form meaningful further combinations.

In the drawing.

DETAILED DESCRIPTION OF EXEMPLARY EMBODIMENTS OF THE PRESENT INVENTION

Figure 1:
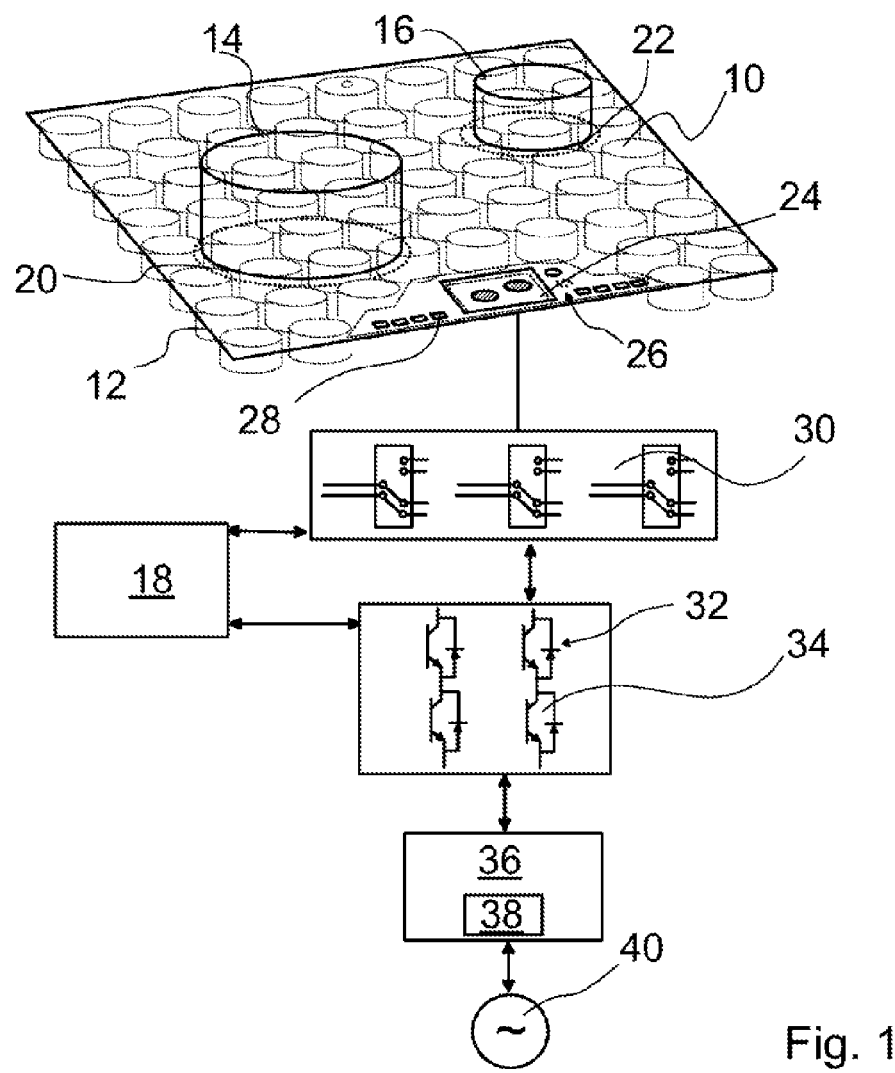
FIG. 1 shows a hob having a plurality of heating elements and a control unit according to a first embodiment of the invention.

FIG. 1 shows a hob having a plurality of heating elements and a control unit 18 according to a first embodiment of the invention. The heating elements are inductors 10, which are distributed in a regular two-dimensional grid over the whole surface of the hob.

The inductors 10 are covered by a cover plate 12 made of glass or glass ceramic, on which cookware elements 14, 16 such as cooking pots or pans can be placed. The control unit 18 generates low voltage measurement currents to detect the cookware elements 14, 16, said measurement currents flowing through the oscillating circuits surrounding the inductors 10 and/or inductors 10. If a cookware element 14, 16 covers one of the inductors 10 wholly or partially, the inductance of said inductor 10 is affected. The extent of the change in the inductance is linked to the degree of cover here. Furthermore, the eddy current losses in the base of the cookware element 14, 16 also affect the attenuation of the oscillating circuit. The control unit 18 can therefore determine the presence and the degree of cover of the cookware element 14, 16 from the oscillation properties of the oscillating circuit and can also draw conclusions as to the material properties of the cookware element 14, 16 and/or material properties of its base.

After detecting a cookware element 14, 16, the control unit 18 combines those inductors 10, which are covered by the base of the cookware element 14, 16 with at least a certain degree of cover, to form a heating zone 20, 22 which is adjusted to the cookware element 14, 16 in terms of size, shape and position.

The hob comprises a user interface 26 having several actuators 28 and a display 24. The heating zone 20, 22 specified in the afro-described fashion is shown on the display 24 as a pictogram, depending on the shape of the cookware element 14, 15, for instance as a circle, oval or rectangle, so that the user has an overview of the active heating zones 20, 22.

The user can then set a heating capacity for each of the heating zones 20, 22 by way of the actuators 28 of the user interface 26. To this end, the user sets a capacity level, which can assume whole-number and half-number values between 0 and 9 for instance. The control unit 18 converts the capacity level to a heating capacity and operates the inductors 10, so that the desired heating capacity is consumed overall in the inductors 10 of the relevant heating zone 20, 22.

To this end, the control unit 18 connects the inductors 10 of the heating zone 20, 22 to one or several inverters 32 of a power electronics module of the hob by actuating a switch arrangement 30. The inverters 32 comprise unipolar semiconductor switches 34, which, in the exemplary embodiment, are embodied as transistors with insulated gate electrodes (IGBTs) having diodes connected in parallel. The semiconductor switches 34 arranged in a half-bridge configuration are each connected to a pole of a rectifier 36, which is connected to a phase 40 of a domestic power network by way of a filter switching circuit 38.

The heating current generated by the inverters 32 with a frequency which lies approximately in the region between 75 kHz and 100 kHz generates a rapidly alternating magnetic field in the inductors 10, said magnetic field causing eddy currents in the ferromagnetic base of the cookware element 14, 16. The eddy currents finally generate heat in this base. The frequency of the heating current lies above a resonant frequency of the whole system comprising the inductor 10, a resonance capacitor (not shown here) and the base of the cookware element 14, 16. As frequency increases, fewer and fewer Weiss domains can follow the magnetic alternating field in the ferromagnetic base of the cookware element 14, 16 so the power dissipation and thus the heating capacity reduces. By varying the frequency of the heating current, the heating capacity coupled into the base of the cookware element 14, 16 by the inductors 10 can therefore be set by the control unit 18. Furthermore, the control unit 18 can switch the inductors 10 on and off periodically in order to achieve a specific, desired heating capacity when averaged over time.

Based on the heating capacity determined from the input into the user interface 26, the control unit 18 now selects a heating capacity distribution. This selection is a function of the size of the heating zone 20, 22 and/or of the cookware element 14, 16, the material properties of the base of the cookware element 14, 16, the number of inverters 32 available to operate the inductors 10 of the heating zone 20, 22 and the desired heating capacity. The heating capacity distribution determines the proportion of the heating capacity of the whole heating zone 20, 22 consumed by the individual inductors 10. In the simplest case, the heating capacity distribution is an equal distribution. The heating capacity is then divided by the number of inductors 10 of the heating zone 20, 22, in order to calculate the proportion for each individual inductor.

In a particularly advantageous embodiment of the invention, the control unit 18 distributes the heating capacity among a larger number of inductors 10 in the case of heating capacities below a threshold value than in the case of heating capacities above this threshold value.

Figure 2:
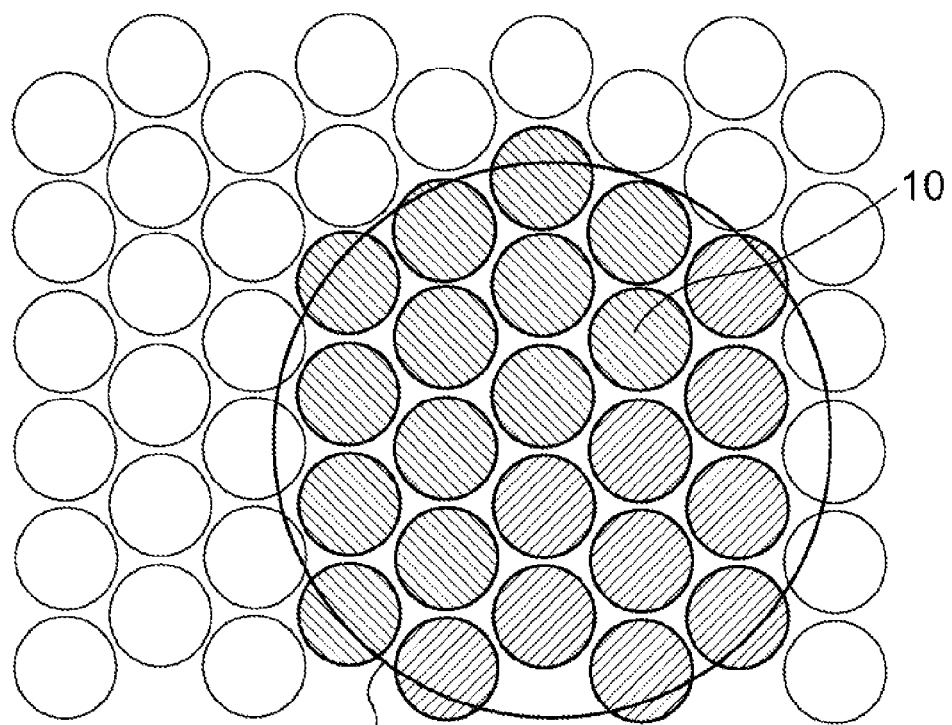
FIG. 2 shows the heating elements of a heating zone of the hob from FIG. 1 having a heating capacity distribution used for low heating capacities.

FIG. 2 shows the heating elements of a heating zone 20 of the hob from FIG. 1 having a heating capacity distribution used for low heating capacities. In the exemplary embodiment shown in FIG. 2, the heating zone 20 is formed by all inductors 10, which are at least 40% covered by the cookware element 14, 16. If the user selects a heating capacity below the threshold value, all inductors 10 of the heating zone 20 are operated in order to achieve as homogeneous a heating capacity as possible. The heating capacity is then distributed equally among all inductors 10 of the heating zone 20. Different hatchlings indicate that the relevant inductors 10 are supplied by different inverters 32.

Figure 3:
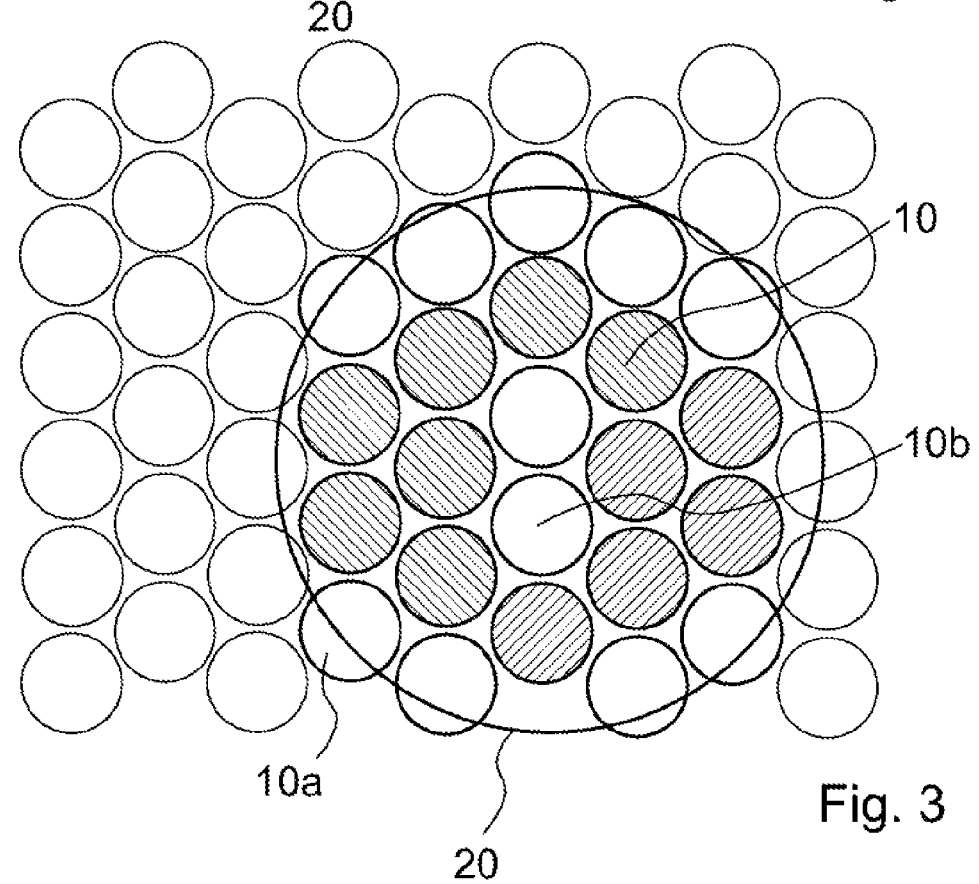
FIG. 3 shows the heating elements of the heating zone from FIG. 2 having a heating capacity distribution used for higher heating capacities.

FIG. 3 shows the heating elements of the heating zone 20 from FIG. 2 having a heating capacity distribution used for higher heating capacities. For heating capacities above the threshold value, an inductor 10 or several inductors 10a, 10b are deactivated. The active inductors 10 are shown hatched and the deactivated inductors 10a, 10b are shown as empty circles with thicker edge lines. The control unit 18 switches off at least one inductor 10a, which is arranged at an edge of the heating zone 20. For very large heating zones 20, the control unit 18 also switches off at least one inductor 10a, which is surrounded by other inductors 10a of the same heating zone 20 on at least three sides. The heating capacity is then distributed among the remaining, active inductors 10 to form the same parts.

As a result, ohmic conduction losses and scattering losses due to partially covered inductors 10 at the edge of the heating zone 20 on the one hand can be reduced and on the other hand the remaining inductors 10 can be operated at a lower heating frequency so that fewer switching processes per time and therefore a lower energy consumption can be realized in the inverters 32. The energy needed for the switching processes can be significantly reduced because the inverters 32 can be operated in the resonant range of the oscillating circuits surrounding the inductors 10.

The control unit 18 therefore selects the heating capacity distribution from at least two different heating capacity distributions for a predetermined cooking pot with a specific position. The heating capacity distribution is a standardized distribution function, which selects the percentage proportions of the overall heating capacity of the heating zone 20 for individual inductors. According to the first heating capacity distribution, the heating capacity is distributed equally among all inductors 10 and according to the second heating capacity distribution, the heating capacity is only distributed equally among some of the inductors 10.

If a heating zone comprises fewer than five heating elements, the heating capacity is always distributed equally among the heating elements, since the additional control outlay in this case would not be justified.

In an alternative embodiment of the invention, the control unit 18 is configured, by means of a time recording means and suitable software, to use a different heating capacity distribution in a heating-up phase of a cooking process, from the heating capacity distribution in at least one phase which follows the heating-up phase. In particular, it is conceivable, in the heating-up phase which can last approximately two minutes, to utilize a different threshold value for switching between different heating capacity distributions from the threshold value after the end of the heating-up phase, so that this threshold value can be configured in a time-dependent fashion.

Figure 4:
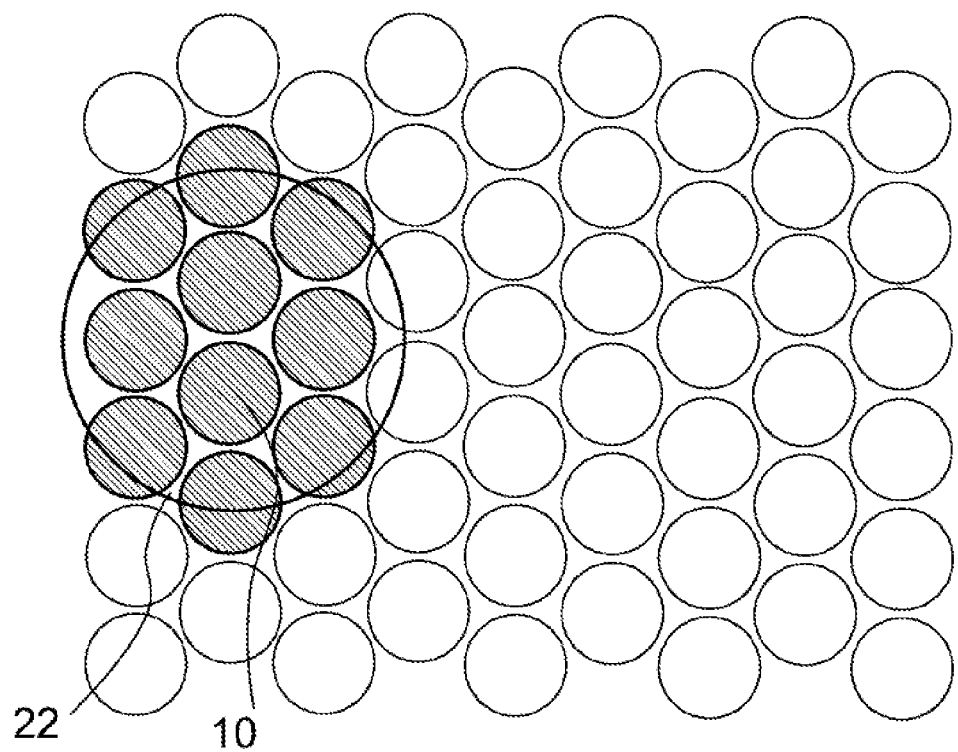
FIG. 4 shows the heating elements of a smaller heating zone of the hob from FIG. 1 having a heating capacity distribution used for low heating capacities.

FIG. 4 shows the inductors 10 of a smaller heating zone 22 of the hob from FIG. 1 with a heating capacity distribution used for low heating capacities, in which the heating capacity is distributed equally among all inductors 10 of the heating zone 22.

Figure 5:
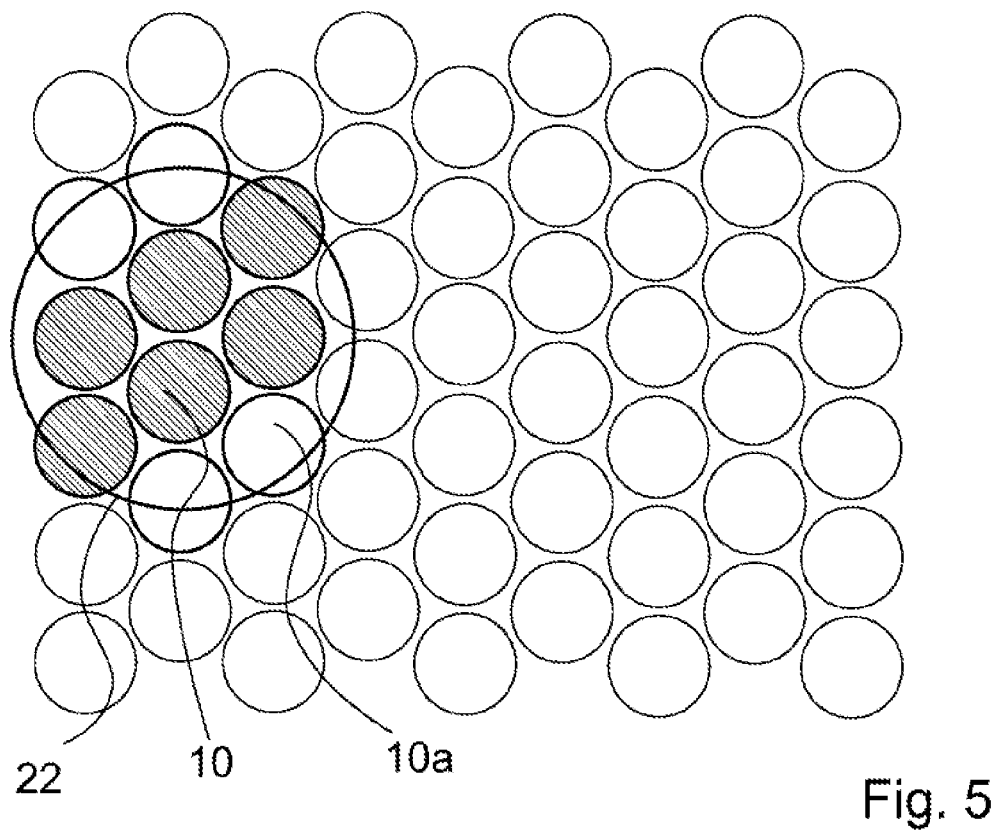
FIG. 5 shows the heating elements of the heating zone from FIG. 4 having a heating capacity distribution used for higher heating capacities.

FIG. 5 shows the heating elements of the heating zone 22 from FIG. 4 with a heating capacity distribution used for higher heating capacities, in which four inductors 10 arranged at the edge of the heating zone 22 are switched off in order to be able to operate the remaining inductors 10 with a higher degree of efficiency.

Figure 6:
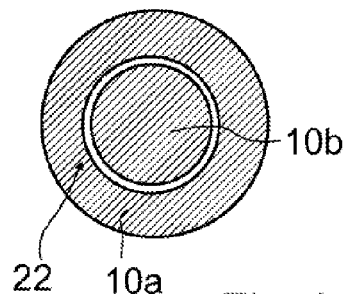
FIG. 6 shows a heating zone having concentric heating elements according to an alternative embodiment of the invention.

FIG. 6 shows a heating zone 22 with concentric inductors 10 according to an alternative embodiment of the invention. The heating zone 22 comprises two concentrically arranged inductors 10, with an annular inductor 10a surrounding a central, circular inductor 10b. The outer, annular inductor 10a is activated for larger pots and generates the larger part of the heating capacity in the case of high heating capacities. The invention can naturally be easily generalized to heating zones having three or more concentric heating elements.

Figure 7:
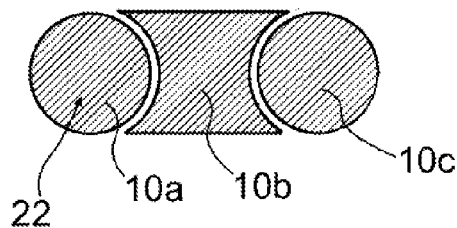
FIG. 7 shows a bridge roaster heating zone in a hob according to a further alternative embodiment of the invention.

FIG. 7 shows a bridge roaster heating zone 22 in a hob according to a further alternative embodiment of the invention. Two round inductors 10a, 10b can be connected by a third inductor 10c to form an oblong heating zone 22, which can be used to heat a large roaster. The control unit 18 of this hob distributes the heating capacity among the inductors 10a, 10b, 10c as a function of the detected size and position of the roaster and as a function of the set capacity level.

Figure 8:
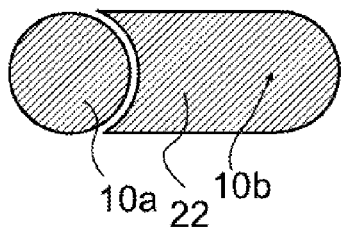
FIG. 8 shows a roaster heating zone in a hob according to a further alternative embodiment of the invention.

FIG. 8 shows a roaster heating zone 22 in a hob according to a further alternative embodiment of the invention. A round inductor 10a can be extended by a further inductor 10b to form an oblong roaster heating zone 22.

Figure 9:
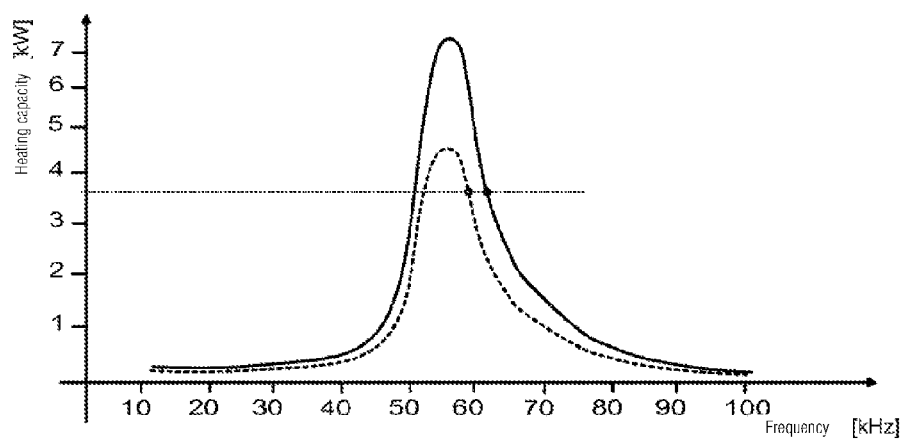
FIG. 9 shows a frequency dependency of a heating capacity for two different heating capacity distributions of a heating zone and FIG. 10 shows a capacity dependency of a heating current for two different heating capacity distributions of a heating zone.

FIG. 9 shows a frequency dependency of a heating capacity for two different heating capacity distributions of a heating zone 20. The upper, continuous line corresponds to an equal distribution among all inductors 10 in the manner shown in FIG. 2 and the lower, dashed line corresponds to a concentration among a smaller number of inductors 10 in the manner shown in FIG. 3. It can be seen that the same heating capacity can be achieved with a smaller number of heating elements at a lower frequency of the heating current. The frequency is also closer to the resonant frequency of the system, which corresponds to the maximum of the curves. It can therefore be seen that by deactivating individual inductors 10, the switching losses can be reduced.

Figure 10:
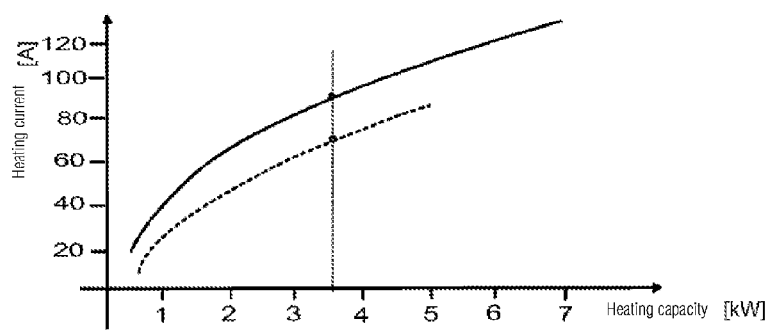

FIG. 10 shows a capacity dependency of a heating current for two different heating capacity distributions of a heating zone 20, 22. For an identical heating capacity, larger current values are required for the higher number of inductors 10, which results in larger ohmic losses in the semiconductor switches 34 of the inverter 32.

The control unit 18 is a universally programmable computing unit, in which a method for operating a hob comprising at least one heating zone 20, 22 having several heating elements is implemented. Operation takes place as a function of a heating capacity set by way of a user interface 26 of the hob, with the heating capacity being distributed among the heating elements according to a heating capacity distribution and the heating capacity distribution being adjusted to the heating capacity.

REFERENCE CHARACTERS

10 Inductor
10a Inductor
10b Inductor
10c Inductor
12 Cover plate
14 Cookware element
16 Cookware element
18 Control unit
20 Heating zone
22 Heating zone
24 Display
26 User interface
28 Actuator
30 Switch arrangement
32 Inverter
34 Semiconductor switch
36 Rectifier
38 Filter switching circuit
40 Phase

The invention claimed is:

1. A hob, comprising:
a plurality of heating elements;
at least one heating zone that includes particular ones of the heating elements;
a user interface for setting a heating capacity of the heating zone; and
a control unit for operating the heating elements and for distributing the heating capacity among the heating elements according to a heating capacity distribution as a function of the heating capacity set by the user interface, the control unit being configured to distribute the heating capacity among a first number of heating elements when the heating capacity is below a threshold value and among a second number of heating elements when the heating capacity is above the threshold value,
wherein the heating capacity is distributed uniformly among all of the first number of heating elements when the heating capacity is below the threshold value,
the heating capacity is distributed uniformly among all of the second number of heating elements when the heating capacity is above the threshold value,
the first number is greater than the second number.

2. The hob of claim 1, wherein each of the heating elements is configured as an inductor.

3. The hob of claim 1, wherein the heating elements are arranged in a uniform grid, and the control unit is configured to detect a piece of cookware and to combine those heating elements which are at least partially covered by the cookware to form the heating zone.

4. The hob of claim 3, wherein the control unit is configured to activate, when the heating capacity is below the threshold value, at least one heating element which is more than 50 percent but less than 100 percent surrounded by heating elements of the heating zone in addition to activating the heating elements used for a heating capacity above the threshold value.

5. The hob of claim 4, wherein the control unit is configured to determine the heating capacity distribution as a function of a size and/or the material of the cookware.

6. The hob of claim 5, wherein the control unit is configured to select the heating capacity distribution from at least two different heating capacity distributions.

7. The hob of claim 6, wherein the control unit is configured to use a different heating capacity distribution in a heating-up phase of a cooking process from the heating capacity distribution in at least one phase which follows the heating-up phase.

8. The hob of claim 3, wherein the first number of heating elements includes
at least one of the heating elements that is located at an edge of the heating zone and is less than fully covered by the cookware, and
all of the second number of heating elements.

9. The hob of claim 1, wherein the heating elements of the heating zone are arranged concentrically, with at least one of the heating elements having an annular configuration and surrounding at least a central one of the heating elements.

10. The hob of claim 1, wherein the control unit is configured to detect a piece of cookware and to combine those heating elements which are at least partially covered by the cookware to form the heating zone, and
the first number of heating elements includes at least one of the heating elements that is located at an edge of the heating zone and is less than fully covered by the cookware, in addition to all of the second number of heating elements.

11. The hob of claim 10, wherein the control unit is configured to activate, when the heating capacity is below the threshold value, at least one heating element which is more than 50 percent but less than 100 percent surrounded by heating elements of the heating zone in addition to activating the heating elements used for a heating capacity above the threshold value.

12. The hob of claim 10, wherein the control unit is configured to determine the heating capacity distribution as a function of a size and/or the material of the cookware.

13. The hob of claim 12, wherein the control unit is configured to select the heating capacity distribution from at least two different heating capacity distributions.

14. The hob of claim 13, wherein the control unit is configured to use a different heating capacity distribution in a heating-up phase of a cooking process from the heating capacity distribution in at least one phase which follows the heating-up phase.

15. The hob of claim 1, wherein the control unit is configured to activate, when the heating capacity is below the threshold value, at least one heating element which is more than 50 percent but less than 100 percent surrounded by heating elements of the heating zone in addition to activating the heating elements used for a heating capacity above the threshold value.

16. The hob of claim 1, wherein the control unit is configured to detect a piece of cookware placed on the heating zone and to determine the heating capacity distribution as a function of a size and/or the material of the cookware.

17. The hob of claim 1, wherein the control unit is configured to select the heating capacity distribution from at least two different heating capacity distributions.

18. The hob of claim 1, wherein the control unit is configured to determine the heating capacity distribution as a function of the set heating capacity only when the heating zone comprises at least five heating elements.

19. The hob of claim 1, wherein the control unit is configured to use a different heating capacity distribution in a heating-up phase of a cooking process from the heating capacity distribution in at least one phase which follows the heating-up phase.

20. A method for operating a hob, comprising the steps of:
  determining a heating capacity distribution among heating elements of at least one heating zone as a function of at least a size of the heating zone and/or a set heating capacity;
  distributing the heating capacity among the heating elements of the at least one heating zone according to the heating capacity distribution such that the heating capacity is distributed among a first number of heating elements when the heating capacity is below a threshold value and among a second number of heating elements when the heating capacity is above the threshold value,
  wherein the heating capacity is distributed uniformly among all of the first number of heating elements when the heating capacity is below the threshold value,
  the heating capacity is distributed uniformly among all of the second number of heating elements when the heating capacity is above the threshold value, and
  the first number is greater than the second number.

* * * * *